(12) United States Patent
Breittmayer et al.

(10) Patent No.: US 11,913,086 B2
(45) Date of Patent: Feb. 27, 2024

(54) METHOD FOR RELIEVING STRESSES BY ROTATION

(71) Applicant: SAFRAN AIRCRAFT ENGINES, Paris (FR)

(72) Inventors: Elliott Archibald Breittmayer, Moissy Cramayel (FR); David Gardy, Moissy Cramayel (FR); Jocelyn Bastide, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 117 days.

(21) Appl. No.: 17/639,766

(22) PCT Filed: Sep. 2, 2020

(86) PCT No.: PCT/FR2020/051521
§ 371 (c)(1),
(2) Date: Mar. 2, 2022

(87) PCT Pub. No.: WO2021/044098
PCT Pub. Date: Mar. 11, 2021

(65) Prior Publication Data
US 2022/0325372 A1    Oct. 13, 2022

(30) Foreign Application Priority Data

Sep. 4, 2019   (FR) ...................................... 1909731

(51) Int. Cl.
*C21D 10/00*      (2006.01)
*G01B 7/12*       (2006.01)
(Continued)

(52) U.S. Cl.
CPC ................ *C21D 10/00* (2013.01); *B04B 5/00* (2013.01); *B23P 25/00* (2013.01); *G01B 7/125* (2013.01); *G01B 11/105* (2013.01)

(58) Field of Classification Search
CPC . C21D 10/00; C21D 1/18; C21D 8/00; C21D 11/00; C21D 1/30; G01B 7/125;
(Continued)

(56) References Cited

U.S. PATENT DOCUMENTS 6,904,371 B2 * 6/2005 Sonnichsen ......... G01M 13/028
  702/56
7,464,577 B2 * 12/2008 Habedank ............... F01D 5/286
  29/894.362
(Continued)

FOREIGN PATENT DOCUMENTS

| EP | 1 611 976 A1 | 1/2006 |
| FR | 1 026 815 A1 | 5/1953 |
| FR | 3 058 920 A1 | 5/2018 |

OTHER PUBLICATIONS

International Search Report as issued in International Patent Application No. PCT/FR2020/051521, dated Nov. 30, 2021.

*Primary Examiner* — Lawrence Averick
(74) *Attorney, Agent, or Firm* — Pillsbury Winthrop Shaw Pittman LLP

(57) ABSTRACT

A method for relieving residual stresses in a part includes increasing the rotation speed, which includes measuring, at a first given instant, values representative of the rotation speed and the radial enlargement; measuring, at a second given instant after the first instant, values representative of the rotation speed and the radial enlargement; determining a leading coefficient of a first affine function from the preceding values; determining a target radial enlargement value as a function of a value representative of the rotation speed, in the form of a second affine function, the origin of which is the value of a desired final residual enlargement and the leading coefficient of which is the leading coefficient of the first affine function; stopping the increase in rotation speed of the part from the moment that the actual enlargement of (Continued)

the rotating part corresponds to the target relative radial enlargement value that has been determined.

7 Claims, 3 Drawing Sheets

(51) Int. Cl.
*G01B 11/10* (2006.01)
*B23P 25/00* (2006.01)
*B04B 5/00* (2006.01)

(58) Field of Classification Search
CPC ........ G01B 11/105; G01B 7/22; G01B 11/16; F01D 5/00; F01D 5/027; F01D 5/02; B23P 9/00; B23P 25/00; B23P 19/107; F04D 29/18; G01M 13/028; B23Q 11/1069; B04B 2007/065; B04B 5/00
See application file for complete search history.

(56) References Cited

U.S. PATENT DOCUMENTS

| | | | | |
|---|---|---|---|---|
| 8,051,709 B2 * | 11/2011 | Allen | ....................... | F01D 5/027 73/460 |
| 2004/0034483 A1 * | 2/2004 | Sonnichsen | ......... | G01M 13/028 702/56 |
| 2006/0000089 A1 * | 1/2006 | Habedank | ................ | F01D 5/286 416/168 A |
| 2010/0212422 A1 * | 8/2010 | Allen | ....................... | G01M 1/22 702/56 |
| 2013/0211743 A1 | 8/2013 | Leroux | | |

* cited by examiner

[Fig 1]
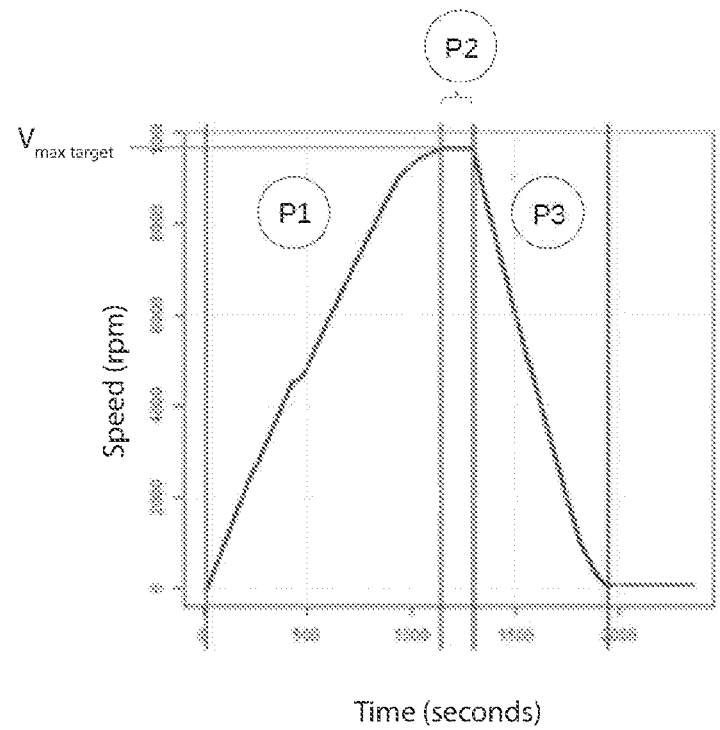
[Fig 2]
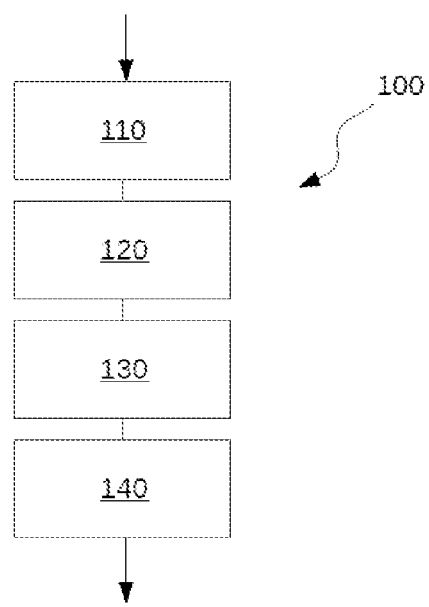

[Fig 3]
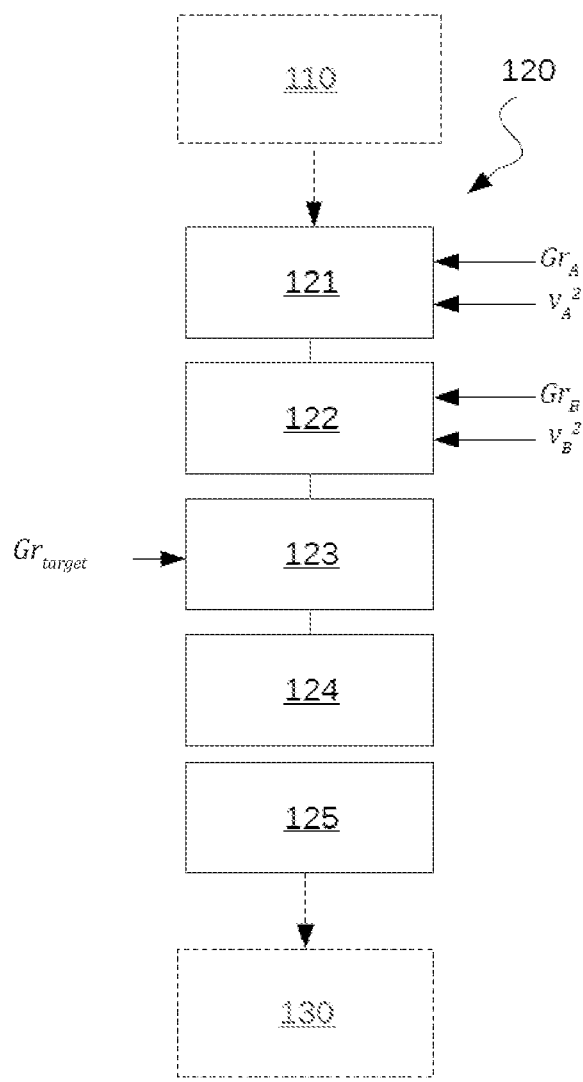

[Fig 4]
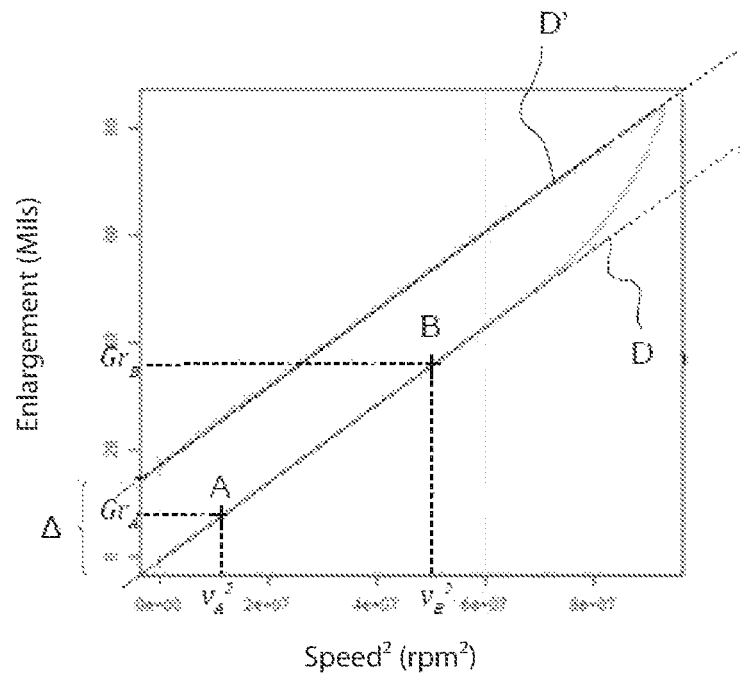
[Fig 5]
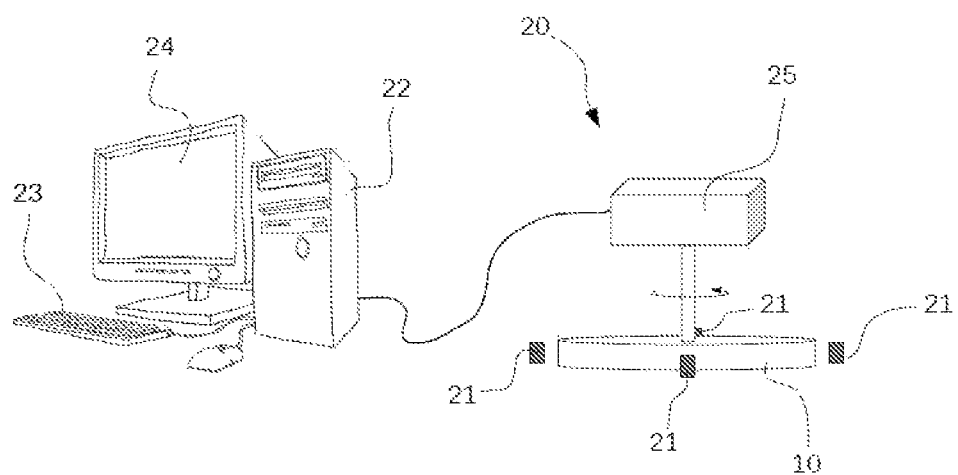

METHOD FOR RELIEVING STRESSES BY ROTATION

CROSS-REFERENCE TO RELATED APPLICATIONS

This application is the U.S. National Stage of PCT/FR2020/051521, filed Sep. 2, 2020, which in turn claims priority to French patent application number 1909731 filed Sep. 4, 2019. The content of these applications are incorporated herein by reference in their entirety.

A. TECHNICAL FIELD OF THE INVENTION

The technical field of the invention is that of the manufacture of parts by forging.

The technical field of the invention more specifically relates to a method for relieving residual stresses induced in a part obtained by a forging method.

The invention has a particularly interesting application in the field of turbomachines, notably for the manufacture by forging of revolving parts of a turbomachine.

B. TECHNOLOGICAL BACKGROUND OF THE INVENTION

During the manufacture of parts by forging, it is known to carry out at least one thermal treatment step (quenching and tempering) in order to improve the mechanical property thereof. During this thermal treatment step, significant residual stresses are generated in the part.

These residual stresses, derived notably from post-forging thermal treatments, may bring about problematic deformations of the parts during machining phases, and notably during the machining of revolving parts. This phenomenon of deformation is notably known and relatively bothersome on nickel based alloy parts.

This problem of deformation is also known in the field of turbomachines, notably during the manufacture by forging of rotating parts, such as for example during the manufacture by forging of turbine discs or compressor discs.

To overcome this drawback, in the range of manufacturing parts by forging, an operation has been put in place, intervening between the thermal treatment and the machining phases, consisting in relieving the residual stresses induced in the parts, and thus minimising the number of necessary machining operations.

Such an operation is for example realised by a method for relieving stresses by rotation, also called "pre-spinning".

This method consists in rotating at high speed a part, ideally a revolving part, in order to deform it plastically and thus redistribute and relieve the internal stresses induced during upstream elaboration and transformation operations.

This method for relieving stresses by rotation may be broken down into three main phases: an acceleration phase, referenced P1, a phase of maintaining at constant speed, referenced P2, and a deceleration phase, referenced P3.

FIG. 1 is a graph illustrating the variation in the rotation speed as a function of time during the implementation of such a method for relieving stresses by rotation, and highlighting the three phases mentioned previously.

Within the context of a production, a certain repeatability is sought during the implementation of this operation for relieving stresses. It is thus sought to control the plastic deformation, that is to say the residual enlargement, of the part by playing on the different phases, and notably the acceleration phase P1 and the maintaining at constant speed phase P2.

A first approach consists in defining, as parameter for stopping the acceleration phase P1, a maximum target rotation speed ($V_{max\ target}$) to reach, the reaching of a certain rotation speed and thus the application of a certain centrifugal force on the part causing a certain state of relieving the stresses in the part in question.

However, the different parts of a production not having a perfectly identical weight, composition and geometry, the use of a single target speed as stoppage parameter is not a satisfactory approach because the residual enlargements obtained with such an approach vary in a too significant manner between the different relieved parts.

Thus, given the large number of parameters coming into play (geometry, composition, properties of the materials, tooling for maintaining parts, internal residual stresses of the parts, weight, etc.), their interaction with each other, it is very difficult to obtain repeatability for a same series during this operation of relieving stresses by rotation. It is then necessary to adapt the method part by part, consequently increasing the manufacturing times and the production costs.

C. SUMMARY OF THE INVENTION

In this context, the invention proposes a novel method for relieving stresses by rotation making it possible to reach a targeted residual enlargement, and thus a certain modification of the internal stresses, automatically and adapting in real time to the forged part without specific intervention of an operator.

To this end, the invention relates to a method for relieving residual stresses in a part by rotation of said part, the method for relieving stresses comprising a step of increasing the rotation speed and a step of decreasing the rotation speed, said method for relieving stresses being characterised in that the step of increasing the rotation speed comprises:

- a first sub-step consisting in measuring, at a first given instant $t_A$, a first value $vA^2$ representative of the rotation speed of said part and a first value $Gr_A$ representative of the radial enlargement of said part at said first instant $t_A$;
- a second sub-step consisting in measuring, at a second given instant $t_B$, after the first instant $t_A$, a second value $v_B^2$ representative of the rotation speed of said part and a second value $Gr_B$ representative of the radial enlargement of said part, at said second instant $t_B$;
- a third sub-step consisting in determining a leading coefficient slope of a first affine function D from said first value $vA^2$ representative of the rotation speed of said part and the first value $Gr_A$ representative of the radial enlargement of said part at said first instant $t_A$ and from said second value $v_B^2$ representative of the rotation speed of said part and said second value $Gr_B$ representative of the radial enlargement of said part, at said second instant $t_B$;
- a fourth sub-step consisting in determining a target radial enlargement value Gr target of said part as a function of a value representative of the rotation speed, in the form of a second affine function D', the origin of which is the value of a desired final residual enlargement Δ and the leading coefficient of which is said leading coefficient slope of said first affine function D determined during the third sub-step;
- a fifth sub-step of stopping the increase in the rotation speed of said part from the moment that the actual enlargement of said rotating part corresponds to said target relative radial enlargement value Gr target determined during the preceding sub-step.

Apart from the characteristics mentioned in the preceding paragraph, the method for relieving stresses according to the invention may have one or more complementary characteristics among the following, considered individually or according to all technically possible combinations thereof:
- that said first sub-step and said second sub-step are carried out at instants ($t_A$, $t_B$) chosen such that the stress generated on the part by centrifugal effect is less than the elastic limit of the material composing said part;
- said method comprises a step of maintaining at constant speed the rotation speed of said part intervening at the end of the step of increasing the rotation speed;
- the rotation speed of said step of maintaining at constant speed corresponds to the maximum rotation speed reached during the step of increasing the rotation speed;
- said step of maintaining at constant speed the rotation speed of said part lasts between 1 and 5 minutes;
- the origin of said second affine function is the value of a desired final residual enlargement Δ from which is subtracted the value of a relative enlargement of said part induced during the step of maintaining at constant speed;
- said part is a turbine disc or a turbomachine compressor disc.

The subject matter of the invention is also a range of manufacturing a revolving part by forging comprising a method for relieving residual stresses induced in said revolving part according to the invention.

The subject matter of the invention is also a device for the implementation of the method for relieving stresses according to the invention, characterised in that it comprises:
- means for rotating said part;
- at least one measurement sensor for measuring the radial enlargement of said part;
- a computer communicating with storage means and receiving as input data: an information relative to the rotation speed of said part, an information relative to the radial enlargement of said part associated with said information relative to the rotation speed.

Advantageously, said at least one contactless measurement sensor such as a laser, a capacitive sensor or an eddy current inductive sensor.

The invention and the different applications thereof will be better understood on reading the description that follows and by examining the figures that accompany it.

D. BRIEF DESCRIPTION OF THE FIGURES

The figures are only presented for indicative purposes and in no way limit the invention.

FIG. 1 is a graph representing the evolution of the speed as a function of time during the implementation of a method for relieving stresses by rotation according to the prior art.

FIG. 2 illustrates a synoptic diagram illustrating the main steps of the method for relieving stresses according to the invention.

FIG. 3 is a synoptic diagram detailing the different sub-steps of the second step of the method for relieving stresses according to the invention.

FIG. 4 is a graph illustrating the radial enlargement of a revolving part as a function of the rotation speed during the implementation of the method for relieving stresses according to the invention.

FIG. 5 is a simplified diagram representing the tooling for the implementation of the method for relieving stresses according to the invention.

Unless stated otherwise, a same element appearing in the different figures has a single reference.

E. DETAILED DESCRIPTION

FIG. 1 has already been described as technological background.

FIG. 2 illustrates a synoptic diagram illustrating the main steps of the method for relieving stresses 100 induced in a forged part 10 according to the invention.

As an example, the forged part 10 is a turbomachine turbine disc, or a turbomachine compressor disc.

This method for relieving stresses 100 is integrated in a more general range of manufacturing a part by forging which can notably integrate the following steps: lamination, die forging, thermal treatments (quenching and tempering), non-destructive testing, machining.

As a reminder, the method for relieving stresses by rotation (pre-spinning) functions thanks to the centrifugal force applied on a part by rotation of said part. The centrifugal force exerted on the part makes it possible to deform it, either elastically when the stress applied on the part by the centrifugal force is less than the elastic limit of the material, or plastically when the stress applied on the part by the centrifugal force is greater than the elastic limit of the material composing the part.

It is recalled that the centrifugal force $F_{centrifugal}$ is a function of the weight of the part m, the distance R between the centre of rotation and the centre of gravity of the system and the angular speed ω according to the following formula:

[Math 1]

$$F_{centrifugal} = m * R * \omega^2$$

In a first step 110 of the method for relieving stresses 100, the part 10 coming from forging operations and a thermal treatment is positioned in a device 20 enabling the rotation of said part 10.

FIG. 5 represents a simplified diagram of such a device 20 for relieving stresses by rotation.

The device 20 comprises means 25 for rotating the part 10, at least one contactless measurement sensor 21 making it possible to measure and to monitor in real time the radial enlargement of the part 10 during rotation. Advantageously, the tooling 20 comprises between two and four measurement sensors 21 radially distributed around the part 10.

The contactless measurement sensors 21 are for example capacitive sensors or eddy current inductive sensors, or lasers.

The measurement sensors 21 are connected to a computer 22 receiving the measurements from the measurement sensors 21 and the parameters of rotation speed of the means 25. Further, the computer 22 communicates with a human-machine interface (HMI) 23 and a display unit 24.

In a second step 120 of the method according to the invention, the part 10 is rotated, and the rotation speed of the part 10 is increased progressively, this is the acceleration phase P1 visible in FIG. 1 described previously.

During this first acceleration phase P1, the rotation speed is increased progressively until reaching a certain speed. During this phase P1, the part 10 deforms firstly elastically then plastically as the rotation speed increases and as the stress exerted on the part, by centrifugal effect, increases.

FIG. 4 illustrates, in the form of a graph, the deformation of the part 10, and more specifically its radial enlargement, as a function of the rotation speed squared, during the different phases of the method for relieving stresses.

FIG. 3 illustrates a synoptic diagram detailing the different sub-steps of the second step 120 of the method for relieving stresses according to the invention, enabling the control of this step of increasing the rotation speed.

In a first sub-step 121, at a given instant $t_A$, the enlargement $Gr_A$ of the part 10 and the corresponding rotation speed squared vat are noted. The point A of FIG. 4 represents this first value pair $(Gr_A, v_A^2)$ recorded by the computer 22.

This instant $t_A$ of recording the parameters of relative enlargement and rotation speed is chosen such that the stress generated on the part 10 by the centrifugal force is less than the elastic limit of the material composing the part 10.

In a second sub-step 122, at a given instant to (after the instant $t_A$), the enlargement $Gr_B$ of the part 10 and the corresponding rotation speed squared $v_B^2$ are measured. The point B of FIG. 4 represents this second value pair $(Gr_B, v_B^2)$ recorded by the computer 22.

This instant to of recording the parameters of relative enlargement and rotation speed is chosen such that the stress generated on the part 10 by the centrifugal force is less than the elastic limit of the material composing the part 10.

Thus, the first sub-step 121 and the second sub-step 122 are carried out when the rotation speed only generates an elastic deformation of said part 10.

During a third sub-step 123, the computer 22 determines the slope, or the leading coefficient, of an affine function D passing through the points A and B, materialising respectively the first pair $(Gr_A, vat)$ and the second pair $(Gr_B, v_B^2)$ measured during the two preceding sub-steps 121 and 122. This affine function D, represented on the graph of FIG. 4, highlights the proportionality relationship between the radial deformation (enlargement) of the part and the rotation speed as long as the part 10 deforms elastically.

The slope, or leading coefficient, of the affine function D symbolising this elastic deformation phase may be determined by the following calculation:

[Math 2]
$$\text{Slope} = \frac{Gr_B - Gr_A}{v_B^2 - v_A^2}$$

From the calculation of the slope symbolising the specific elastic deformation of the part 10 as a function of the rotation speed squared, and from a desired final residual enlargement $\Delta$, the computer 22 determines in a fourth sub-step 124 a set of pairs of target values $(Gr_x, v_x^2)$ making it possible to obtain the desired final residual enlargement $\Delta$ at the end of the relieving cycle.

This set of pairs of values $(Gr_x, v_x^2)$ is represented by a second affine function D', the origin of which is the desired final residual enlargement value A and for which the slope is the slope of the affine function D determined during the third sub-step 123.

The desired final residual enlargement $\Delta$ is a value input by the user via the human machine interface 23 and/or stored in a memory associated with the computer 22.

The computer 22 determines the target enlargement Gr target of the part 110, in question, as a function of these specific properties and as a function of the rotation speed with the following equation:

[Math 3]

$$Gr\text{target} = \text{slope}*\text{speed}^2 + \Delta$$

In a fifth sub-step 125, when the actual radial enlargement of the part 10 is equivalent to the target enlargement $G_r$ target, calculated by the computer 22, this stops the acceleration phase P1.

Optionally, in a third step 130, the part 10 is maintained in rotation at constant speed, at the maximum speed reached during the preceding step corresponding to the target enlargement Gr target, during a predetermined period, called maintaining time. This step 130 is the second phase P2 described previously and represented in [FIG. 1].

During this time of maintaining at constant speed, the part 10 continues to deform plastically slightly. This third step 130 of maintaining at constant speed enables structural homogenisation and enables visco-plastic deformations to stabilise.

For example, this maintaining step 130 is carried out for between 1 and 5 minutes, and advantageously during a period of the order of 2 minutes.

When this step 130 of maintaining at constant speed is provided in the method for relieving stresses 100, it is necessary to take into account in the preceding steps, the enlargement, or plastic deformation, of the part during the maintaining time, which will be called maintaining time enlargement, $G_r$ maintaining time.

Thus, in the formula presented previously, it is necessary to take into account, in the calculation of the target enlargement Gr target, the maintaining time enlargement $G_r$ maintaining time.

This enlargement during the maintaining time may be defined empirically and be common to the different parts of a same series. This being very small compared to the enlargement undergone by the part 10 during the acceleration phase, the variations obtained with an enlargement of the estimated maintaining time impact very little the final result, with a variation between the different parts less than or equal to 1%.

In this case, the calculation of the target enlargement is the following:

[Math 4]

$$Gr\text{target} = \text{slope}*\text{speed}^2 + \Delta - Gr\text{maintaining time}$$

In a fourth step 140, the computer 22 controls the deceleration of the rotating means 25: the deceleration phase P3 is entered, consisting in decreasing progressively the rotation speed to reach the complete stoppage and the end of the stress relieving cycle.

During deceleration, the radial enlargement of the part 10 decreases progressively with speed following the straight line D' mentioned previously, there is then the phenomenon of elastic return of the part.

At complete stoppage, the residual enlargement obtained on the part in question then corresponds to the desired final enlargement $\Delta$.

Thus, the method for relieving stresses by rotation according to the invention makes it possible to obtain automatically and without prior development the desired residual enlargement corresponding to a desired state of relieving stresses.

The method for relieving stresses by rotation according to the invention makes it possible to adapt automatically and specifically to the geometric, structural, composition and mounting characteristics of a part without intervention of an operator and without carrying out a test campaign beforehand.

This adaptability is enabled notably by taking into account the specific structural behaviour of each part and the mechanical characteristics thereof (notably the elastic deformation mode) in the course of the stress relieving cycle.

Thus, the method for relieving stresses by rotation according to the invention makes it possible to have a repeatable process and parts that have a same final stress relieved state.

The invention has been described specifically for relieving stresses in a turbomachine turbine disc, however the invention is also applicable to all the revolving parts of a turbomachine necessitating an operation of relieving stresses induced by a post-forging thermal treatment.

The invention claimed is:

1. A method for relieving residual stresses in a part by rotating said part, the method for relieving stresses comprising a step of increasing a rotation speed and a step of decreasing the rotation speed, wherein the step of increasing the rotation speed comprises:
    a first sub-step consisting in measuring, at a first given instant, a first value representative of the rotation speed of said part and a first value presentative of the a radial enlargement of said part at said first instant;
    a second sub-step consisting in measuring, at a second given instant after the first instant, a second value representative of the rotation speed of said part and a second value representative of the radial enlargement of said part, at said second instant;
    a third sub-step consisting in determining a leading coefficient of a first affine function from said first value representative of the rotation speed of said part and the first value representative of the radial enlargement of said part at said first instant and from said second value representative of the rotation speed of said part and said second value representative of the radial enlargement of said part, at said second instant,
    a fourth sub-step consisting in determining a target radial enlargement value of said part as a function of a value representative of the rotation speed, in the form of a second affine function, an origin of which is the value of a desired final residual enlargement and the leading coefficient of which is said leading coefficient of said first affine function determined during the third sub-step,
    a fifth sub-step of stopping the an increase in the rotation speed of said part from the moment that the actual enlargement of said rotating part corresponds to said target relative radial enlargement value determined during the preceding sub-step.

2. The method for relieving stresses according to claim 1, wherein said first sub-step and said second sub-step are carried out at instants chosen such that the stress generated on the part by centrifugal effect is less than the elastic limit of the material composing said part.

3. The method for relieving stresses according to claim 1, further comprising a step of maintaining at constant speed the rotation speed of said part, said step intervening at an end of the step of increasing the rotation speed.

4. The method for relieving stresses according to claim 3, wherein the rotation speed of said step of maintaining at constant speed corresponds to a maximum rotation speed reached during the step of increasing the rotation speed.

5. The method for relieving stresses according to claim 1, wherein said step of maintaining at constant speed the rotation of said part lasts between 1 and 5 minutes.

6. The method for relieving stresses according to claim 2, wherein the origin of said second affine function is the value of a desired final residual enlargement from which is subtracted the value of a relative enlargement of said part induced during the step of maintaining at constant speed.

7. The method for relieving stresses according to claim 2, wherein said part is a turbine disc or a turbomachine compressor disc.

\* \* \* \* \*